Oct. 16, 1934. B. F. WILLIAMS 1,977,219
HOSE COUPLING
Filed Dec. 27, 1932
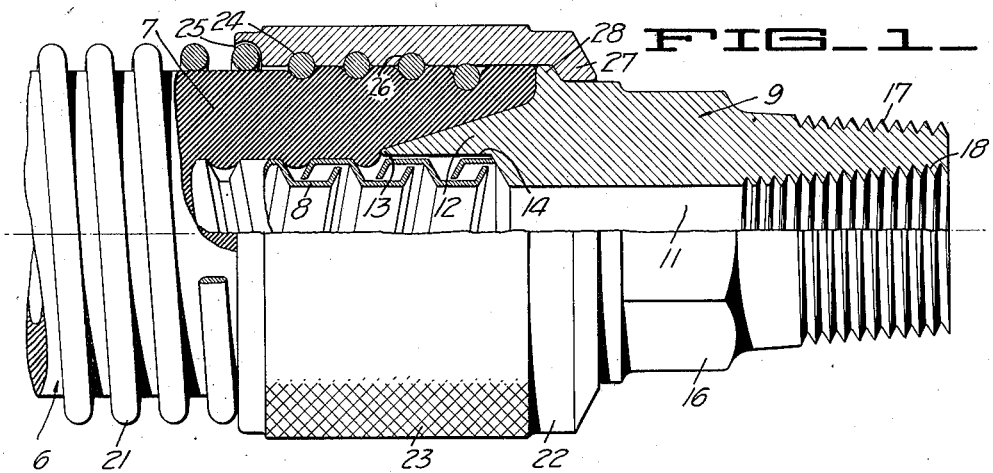
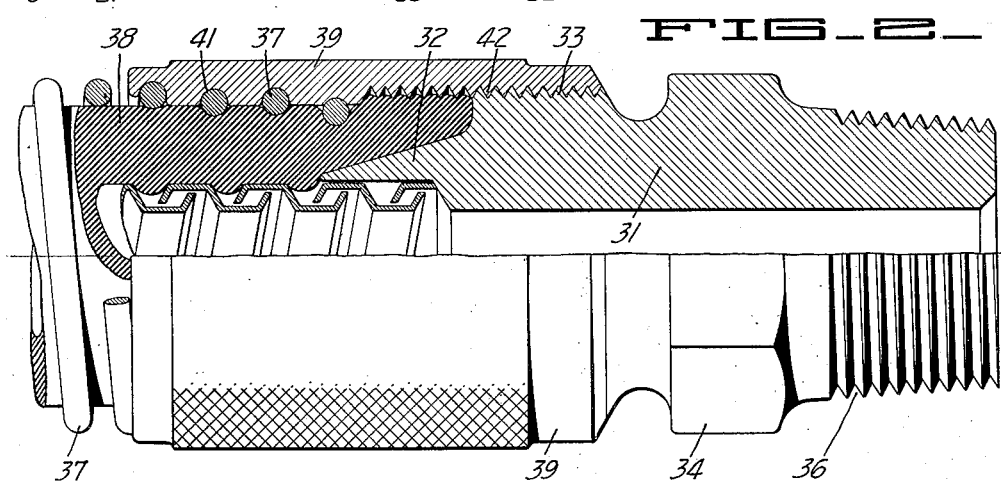
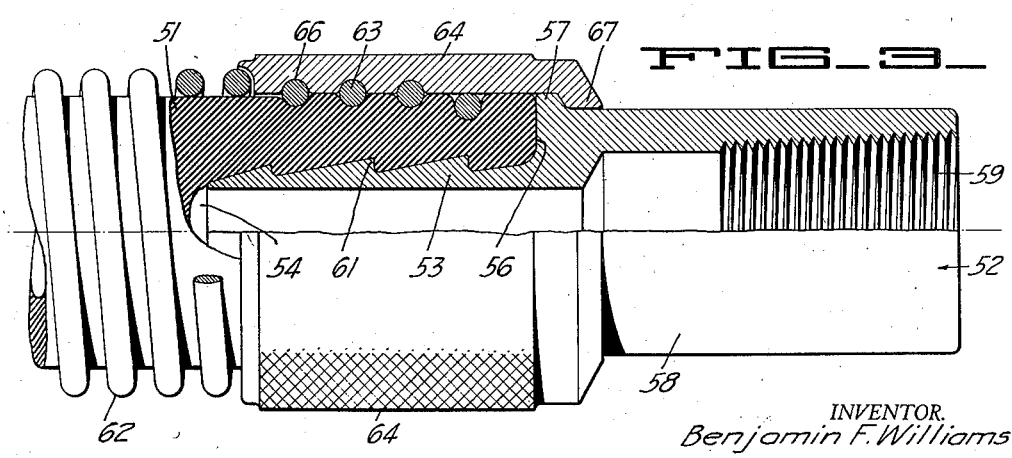
INVENTOR.
Benjamin F. Williams
BY White, Prost, Flehr & Lothrop
ATTORNEYS.

Patented Oct. 16, 1934

1,977,219

UNITED STATES PATENT OFFICE 1,977,219

HOSE COUPLING

Benjamin F. Williams, San Francisco, Calif., assignor to Wil-Bro Corporation, San Francisco, Calif., a corporation of California Application December 27, 1932, Serial No. 648,834

3 Claims. (Cl. 285—86)

My invention relates in general to couplings adapted to be secured to the end of a hose and is especially concerned with couplings of the type disclosed in my co-pending application, Serial No. 616,976, filed June 13, 1932.

An object of my invention is in general to improve hose couplings.

Another object of my invention is to provide a hose coupling which is firmly secured to a hose.

A further object of my invention is to provide a hose coupling especially adapted for use with a hose having a lining therein.

A still further object of my invention is to provide a hose coupling in which the major parts are capable of re-use.

An additional object of my invention is to provide a hose coupling having no protruding parts.

The foregoing and other objects are attained in the embodiment of the invention shown in the drawing, in which—

Figure 1 is a side elevation of a hose coupling in accordance with my invention, a portion of the figure being in cross-section on a longitudinal radial plane.

Figure 2 is a side elevation with a portion in cross-section on a longitudinal, diametral plane of a modified form of hose coupling in accordance with my invention.

Figure 3 is a side elevation with a portion in cross-section on a longitudinal, diametral plane of a further modified form of hose coupling in accordance with my invention.

In its preferred form, the hose coupling of my invention is adapted primarily for use with a hose having a hose wall and a lining, and includes an insert having a reduced end adapted to be received between the hose wall and the lining, and having a shoulder adapted to abut the hose wall, together with a compression member encompassing the hose wall and compressed into the hose wall by a clamp screwed onto the compression member and having a flange adapted to abut the shoulder on the insert.

In the form of hose coupling particularly illustrated in Figure 1, there is provided a device especially adapted for use with a hose generally designated 6. This hose, for illustration, is a type of hose commonly available in the trade, and includes an outer, annular hose wall 7 usually of rubber or comparable deformable material, and an inner lining 8 which ordinarily is flexible, metallic tubing or other comparable relatively rigid material. Usually the rubber hose wall 7 is closely interlocked with and often is bonded to the metallic lining 8.

In accordance with my invention, I preferably provide an insert, generally designated 9, which is of cylindrical contour in cross-section and is rendered hollow by a bore 11 usually of circular cross-section. Preferably, the insert at one end or adjacent one end is reduced in diameter to provide a tapering or conical portion or terminus 12 which is thin and ends in a circular knife edge 13. From the knife edge 13 to a point adjacent the middle of the insert 9, I preferably provide a counterbore 14 of slightly larger diameter than the bore 11. The tapered or conical portion 12 is adapted to be inserted into the hose 6 and to be received between the hose wall 7 and the lining 8 with the counterbore 14 overlying the lining. The insert 9 deforms the material of the hose wall 7 somewhat and provides a reasonably firm engagement.

Partially to assist in the insertion of the insert 9 into the hose, I provide a non-circular or nut portion 16 on the insert, which can be engaged by any suitable tool for rotating and working the insert during its insertion between the hose wall 7 and the lining 8. If desired, the insert 9 can be provided with engaging means such as threads 17 and 18 for co-operation with comparable threaded elements in the usual fashion. Ordinarily, the threads 17 and 18 are provided alternatively, but for purposes of illustration I have disclosed both threads 17 and threads 18 in Figure 1.

In order to retain the insert 9 firmly in place against dislodgment even by relatively high stresses, I preferably install on the hose wall 7 a compression member 21 which preferably takes the form of a helical or thread-like member usually of wire or other malleable and flexible material. Preferably, the wire is wrapped around the hose 6 and about the insert 9, but in certain instances can be suitably preformed. The initial form of the compression member 21, that is, its regularity and spacing and tightness, is relatively immaterial. In order to form the compression member into a true helix and to embed the compression member 21 in the material of the hose wall 7, I preferably provide a clamp 22 which usually is of circular cylindrical form in cross-section and is roughened or knurled as at 23 on its exterior for convenience in handling. The clamp 22 on its interior surface is provided with a helical groove 24 in one portion 25 of which the groove is relatively deep radially and emerges from the interior of the clamp. The remaining portion 26 of the groove gradually merges with the deep portion and is relatively shallow in radial depth.

The clamp 22 is preferably passed over the projecting end of the insert 9 and the groove portion 24 engages the leading portion of the wire 21. The clamp 22 is then rotated and advanced over the wire, the deep portion 25 forming the roughly helical member into a true helix, while the following shallow portion 26 compresses the member 21 into the material of the hose wall 7 which in turn is forced or compressed against the insert 9 to effect a tight engagement therewith.

In order further to secure the engagement and to make the clamp 22 effective to hold the insert 9 in position, I preferably terminate the clamp 22 in a radially inturned annular flange 27 which is adapted to abut a radially extending peripheral shoulder 28 formed integrally with the insert 9 and adapted, when the insert is in position, to abut the end of the hose wall 7. When the clamp 22 is screwed axially of the hose as far as it will go, the flange 27 abuts the shoulder 28 which in turn abuts the hose wall 7 so that the various portions of the hose coupling are interlocked and are held in firm engagement against dislodgment even though unusual stresses are placed thereon. If desired, and especially with large sizes, it may be advantageous in the final turning movement of the clamp 22 to apply a wrench or other comparable tool thereto and to hold the nut 16 with a similar tool in order to effect a very tight frictional interengagement between the parts.

In the form of my hose coupling shown in Figure 2, I preferably provide an interior structure substantially as shown in Figure 1, but in this instance the insert 31 is provided adjacent its conical portion 32 with external threads 33 or other suitable interlocking means and is likewise formed with a non-circular or nut portion 34 interposed between the threads 33 and additional threads 36 for engagement with a comparable fitting. Overlying a compression member 37 which encompasses the hose wall 38, is a clamp 39 having an interior groove 41, as described in connection with the structure of Figure 1, and likewise having internal threads 42 adapted to engage the threads 33.

In this arrangement the clamp interengages with the insert and holds the parts in very tight frictional engagement. This is particularly true inasmuch as the threads 33 can be formed with such a pitch with respect to the compression member 37 as effectively to draw the hose wall 38 firmly onto the tapered or conical terminus 32.

In the form of the device shown in Figure 3, there is provided a hose, generally designated 51, into which an insert 52 is introduced, with the projecting portion 53 of the insert located within the bore 54 of the hose. The insert is provided with a radial abutting face 56 merging into an annular, radial shoulder 57, and terminates in a cylindrical portion 58. The portion 58 is preferably provided with internal threads 59 for the reception of a comparable coupling member. Suitable barbs 61 on the insert provide an interengagement with the material of the hose 51.

Encompassing the hose 51 and preferably extending for a considerable distance along the hose to form a guard 62 is a wire or other comparable compressing member 63. This member is preferably wrapped about the hose somewhat at random but in a roughly helical form and overlies or lies about the portion 53 of the insert. Adapted to engage the compression member 63 is a clamp 64 of generally circular cylindrical contour in cross-section and provided with an interior helical groove 66 in all respects comparable to the groove 24 in the device in Figure 1. When the clamp 64 is screwed upon the wire 63, it forms the wire into a true helix and advances until an inturned radial flange 67 at one end of the clamp abuts the shoulder 57 on the insert. Due to this interlocking engagement, the hose 51 is held very tightly and with considerable friction not only by the barbs 53 and the wire 63 but also by the shoulder 57 on the insert itself. This arrangement precludes dislodgment even under very high pressures and extraordinary stresses.

I claim:

1. A hose coupling for use with a hose having a deformable hose wall and a lining comprising an insert having a smooth passage therethrough adapted to receive said lining and having a smooth conical portion adapted to extend between said lining and said hose wall, a circular peripheral shoulder on said insert, a helical compression member encompassing said hose wall, a cylindrical clamp screwed upon said compression member, and a circular flange on said clamp interengaging said shoulder.

2. A hose coupling for use with a hose having a hose wall and a lining, comprising an insert adapted to extend between said hose wall and said lining, a shoulder having a flat face on said insert, a compression member encompassing said hose wall, a clamp engaging said compression member, and a flange having a flat face on said clamp, the flat face on said clamp being adapted to abut the flat face on said shoulder.

3. A hose coupling for use with a hose having a hose wall and a lining comprising an insert adapted to receive said lining and having a conical terminus adapted to extend between said hose wall and said lining, a continuous peripheral shoulder on said insert adapted to abut said hose wall, a helical compression member encompassing said hose wall about said insert, a cylindrical clamp having a groove therein and engaging said compression member with said member partially disposed in said groove, and a continuous flange on said clamp adapted to abut said shoulder.

BENJAMIN F. WILLIAMS.